Nov. 29, 1938.    R. E. LAYMAN    2,138,065
CHANGE SPEED GEARING
Filed Feb. 14, 1934    2 Sheets-Sheet 2
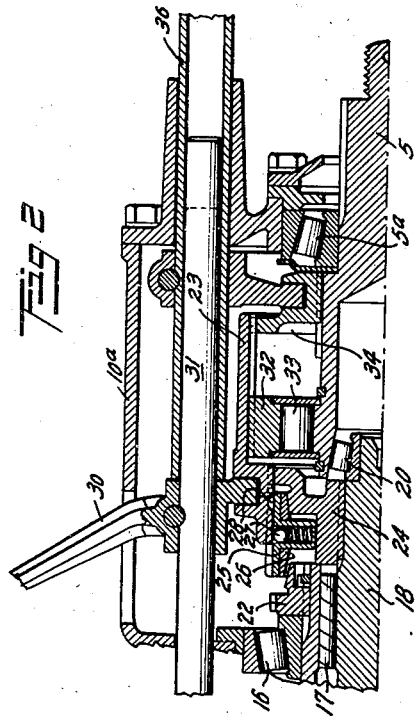
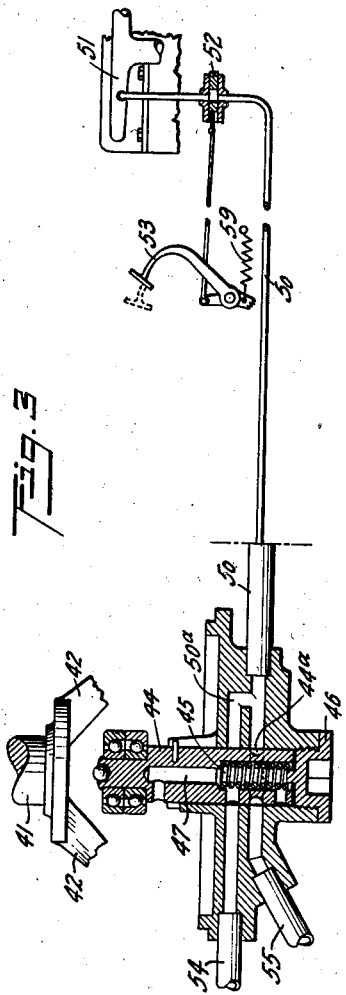
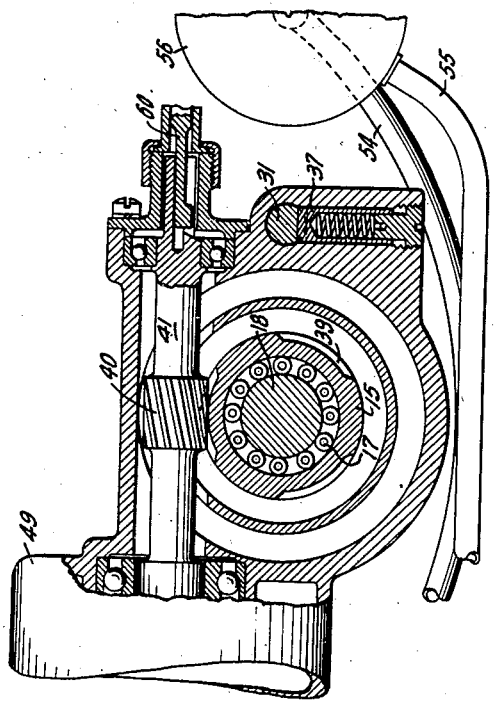
INVENTOR
Ralph E. Layman
BY
F. Bascom Smith
ATTORNEY Patented Nov. 29, 1938

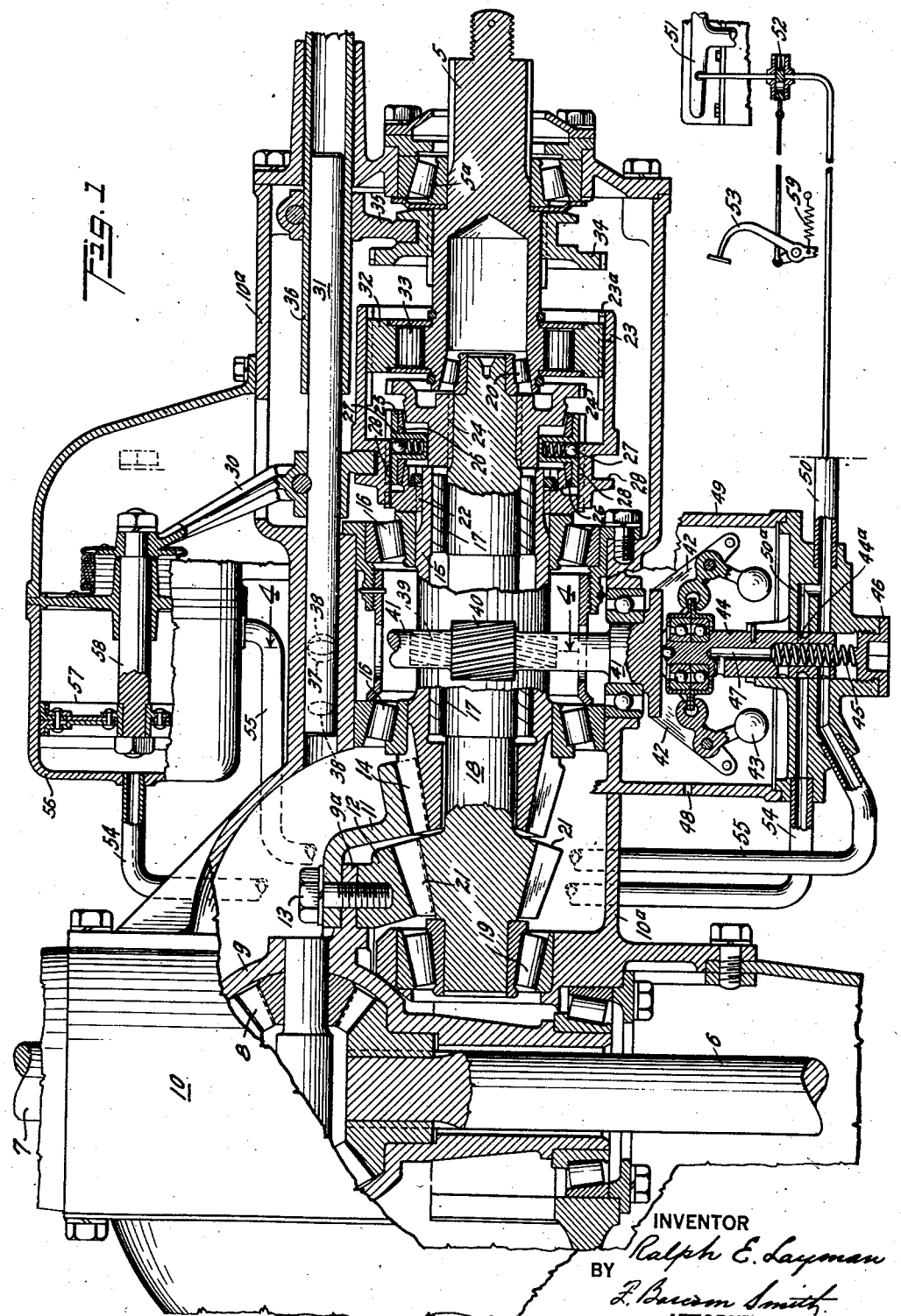

2,138,065

UNITED STATES PATENT OFFICE 2,138,065

CHANGE SPEED GEARING

Ralph E. Layman, Howard Beach, N. Y.

Application February 14, 1934, Serial No. 711,110

13 Claims. (Cl. 74—336.5)

This invention relates to change-speed gearing, and more particularly to a two-speed axle drive for use in motor vehicles.

In two-speed axles heretofore constructed, difficulty has been experienced in selectively connecting the two gear trains with the vehicle propeller shaft due to differences in speed of rotation. For example, if the rear axles of the vehicle are being driven by the fourth, or high-speed, gears, the vehicle propeller shaft will be rotating at a relatively low speed, whereas the third speed gearing, then being driven from the axle end in accordance with the actual speed of the vehicle, will be rotating at a much higher rate. It will be seen, therefore, that when the shift is made there will be a tendency to instantaneously accelerate the mass consisting of the vehicle propeller shaft, its universal joints, the transmission shafts and gearing, as well as the driven members of the main clutch of the vehicle. In previous structures this has resulted in a sudden slowing down of the vehicle, manifested by a jerk, at the same time placing terrific strains on the affected parts. In addition there has been the inevitable clashing of teeth on the clutch members used in these installations when the rapidly moving gearing is drivably connected to the propeller shaft. The reverse action takes place when the shift is made from low to high speed.

One of the objects of the present invention is, therefore, to provide a novel change-speed gearing of the character referred to, which is so constructed that the smooth operation of the vehicle is not interfered with when a change from one gear ratio to another is made.

Another object of the invention is to provide a two-speed axle drive in combination with novel means for shifting from one speed to the other.

Still another object is to provide novel means for shifting a driving connection from one driven member to another driven member having a different speed of rotation.

A further object is to provide automatically operable means for shifting from one gear ratio to another.

Another object is to provide novel means for operatively connecting a speed-indicating instrument with a two-speed axle drive.

The above and other objects and advantages of the invention will appear more fully hereinafter in the detailed description which is to be read in connection with the attached drawings illustrating a preferred embodiment of the novel gearing. It is to be expressly understood, however, that the drawings are for purposes of illustration only and are not designed as a definition of the limits of the invention, reference being had primarily to the appended claims for this purpose. In the drawings:

Fig. 1 is a view, partly in section and partly in top plan, with certain parts broken away in order to employ a large scale;

Fig. 2 is a detail, sectional view illustrating a portion of the shifting mechanism in a different operative position from that shown in Fig. 1;

Fig. 3 is a detail view, partly in section and partly diagrammatic, illustrating one form of shift control that may be employed; and Fig. 4 is a transverse section taken substantially on line 4—4 of Fig. 1.

Only one embodiment of the present invention has been illustrated by way of example, in combination with the power transmitting mechanism of a motor vehicle. As is well understood in the art, motor vehicles are today provided with a transmission, or change-speed gear box, operatively connected to the engine and adapted to drive a propeller shaft that is usually formed in sections, connected by universal joints. Since this construction is well-known, it is not illustrated and it is only necessary to point out that the stub shaft 5, shown at the right-hand end of Fig. 1, is the rear section of the propeller shaft. Shaft 5 may thus be rotated by the engine at varying speeds, and is adapted to drive the axles 6 and 7 of the vehicle.

Interposed between shaft 5 and the axle 6, 7 is the mechanism constituting the subject matter of the present invention. Axles 6 and 7 are operatively connected by means of a differential 8, having a housing 9 mounted in any suitable manner within a rear axle housing 10, 10a. Surrounding differential housing 9, and rigidly and drivably secured thereto, is a pair of nested gears 11 and 12, which are preferably of the bevel, spiral type. As shown, housing 9 may be provided with a flange 9a to receive a plurality of bolts, one of which is shown at 13, for securing said gears 11 and 12 to said housing.

Gear 11 meshes with the pinion 14 formed integrally with, or secured to, a hollow shaft 15, which is journalled in housing 10a as by means of bearings 16. Rotatably mounted within hollow shaft 15, as by means of bearings 17, is a shaft 18 journalled at its inner end, by means of bearing 19, in housing 10a. The outer end of shaft 18 extends into propeller shaft 5 and is rotatably supported therein by means of the thrust bearing 20, the latter coacting with a bearing 5a to rotatably support shaft 5 in housing 10a. A pinion 21 is rigidly secured to, or formed integrally with, shaft 18 and meshes with gear 12.

The two pinions 14 and 21, with their associated shafts, and the gears 11 and 12, constitute two direct drives of low and high ratio, respectively, for the rear axle 6, 7. In the form shown, the ratio of members 14 and 11 is approximately 5:1, while the ratio of members 21 and 12 is approximately 3:1, but this arrangement of ratios may be reversed, if desired, as shown in the patent to Austin, No. 1,091,618, of March 31, 1914, for example.

It will be apparent, in view of the two ratios, that shafts 15 and 18 always rotate at different speeds, one of said shafts rotating in unison with propeller shaft 5, while the other shaft is rotating at a materially different speed. When a shift was made from one gear train to the other in two-speed axles of the type heretofore constructed, much difficulty was experienced due to the necessity, in said constructions, for rapidly accelerating or decelerating certain power transmitting members of the vehicle. This difficulty was not unduly serious when shifting from the low to the high gear ratio, but when shifting from high to low, extreme stresses were placed on the elements of the gear train causing a noticeable interruption in the smooth running of the vehicle. Accordingly, the present invention embodies novel means for selectively drivably connecting shaft 15, or shaft 18, with propeller shaft 5, whereby excessive stresses on the connecting elements, and jerking of the vehicle, is avoided. To this end, hollow shaft 15 has drivably secured thereto, as by means of splines, a gear or clutch member 22, adapted to mesh with an internally splined sleeve 23 constituting a movable clutch member. Shaft 18 is also provided at its inner end with a gear or clutch member 24 having the same diameter as member 22, and likewise adapted to be engaged by the splines provided interiorly of sleeve 23. Interposed between gears 22 and 24, and adapted for longitudinal movement on the hub portion of gear 24, is a movable clutch member 25, having an outer splined diameter equal to that of gears 22 and 24, and at all times having driving engagement with the inner splines of sleeve 23 but being capable of longitudinal movement relative thereto. Member 25 is provided with a pair of friction members 26, having inclined faces for engagement with one or the other of correspondingly inclined friction surfaces on the adjacent gears 22 and 24. Spring pressed balls 27 are carried in recesses in member 25, the balls being adapted to engage recesses 28 formed in the inner surface of sleeve 23. The outer surface of the latter is provided with an annular groove 29 to receive a shifting fork 30 mounted on a slidably mounted shift rod 31.

The outer end of sleeve 23 (the right hand end as viewed in Fig. 1) is interiorly splined for driving engagement with the outer race 32 of a roller clutch, provided with a suitable number of rollers 33, which constitutes a one-way driving connection between propeller shaft 5 and sleeve 23. The outer end of the right-hand splines in sleeve 23 are beveled on one side, as at 23a, and are adapted to be engaged by correspondingly beveled teeth formed on a gear or clutch member 34, splined to shaft 5 and slidable there along as by means of a shifting fork 35 carried by a hollow shaft or sleeve 36 surrounding rod 31.

If gear 34 is moved to the left, Fig. 1, into driving engagement with splines 23a, it will be apparent that a rigid driving connection will be established between shaft 5 and sleeve 23. The same result is secured when sleeve 23 is moved to the right sufficiently to engage gear 34.

When the parts are in the position shown in Fig. 1 torque is transmitted from shaft 5 through the one-way roller clutch 32, 33, through sleeve 23 and through the splines at the left-hand end thereof to member 25, gear 22, shaft 15, pinion 14, and gear 11, to rotate the differential housing and axle 6, 7. There is thus established a direct, low ratio drive between the propeller shaft or driving member and the rear axle. If it is now desired to drive the rear axles through the direct, high ratio drive, rod 31 is moved to the right, in any suitable manner, whereupon sleeve 23 is moved to the right and when balls 27 engage the recesses 28, member 25 is shifted to the right so that friction member 26 engages the friction surface on gear 24, thereby tending to bring the speed of rotation of member 25 and sleeve 23, together with its associated elements, down to the speed of gear 24. At the time of this frictional engagement it will be noted (Fig. 2) that sleeve 23 is no longer in driving engagement with gear 22. The vehicle clutch will be disengaged during the shifting movement, so that no engine torque will be transmitted to propeller shaft 5, and accordingly the shift can be made to bring sleeve 23 into driving engagement with gear 24 and gear 34 without excessive stresses, and without jerking the vehicle. The one-way roller clutch is effective at this time as a driving connection between shaft 5 and sleeve 23 due to the deceleration of the latter, which results from engagement of the friction member 26 on member 25 with the friction surface on the relatively slowly rotating clutch member 24.

If it is now desired to shift from high ratio, direct drive to the low ratio, direct drive, rod 31 is moved to the left, disengageing sleeve 23 from gear 24, and carrying shift member 25 into frictional engagement with the friction surface of clutch member 2, which is rotating at a relatively high speed. Accordingly, sleeve 23 is accelerated and the overrunning clutch is effective to break the driving connection between the relatively slowly rotating shaft 5 and said sleeve. It is thus unnecessary to accelerate any mass other than that of sleeve 23 and the member 25 in order to mesh the splines of the sleeve with gear 22, and this is done without clashing and without jerking the vehicle. When the main vehicle clutch is again engaged and the engine accelerated, propeller shaft 5 is brought up to the speed of sleeve 23 and when it tends to exceed the speed of said sleeve, the roller clutch is effective to reestablish the driving connection. It will be noted that clutch 32, 33 constitutes a free-wheeling unit. If it is desired to eliminate the free-wheeling feature, sleeve 36 may be removed to the left in any suitable manner to engage gear 34 with splines 23a, whereby the roller clutch is rendered ineffective.

As is seen more clearly in Fig. 4, the shifter rod 31 may be held in adjusted position by means of a spring pressed detent 37, carried by housing 10a, and adapted to engage suitable notches 38 formed in rod 31.

If desired, rod 31 and sleeve 36 may be manually shifted by means of a suitable control, as from a third rail in the transmission, but in the embodiment of the invention illustrated, novel automatic means are provided for shifting from low to high ratio drive. As shown, shaft 15 is provided, intermediate its ends, and exteriorly thereof, with a worm gear 39, which meshes with a worm 40, carried by transversely extending shaft 41, suitably journalled in housing 10a. The lower end of said shaft 41 (Fig. 1) is provided with a pair of arms 42, on each of which is pivotally mounted a centrifugal member 43, adapted to engage a valve 44 which is normally held in retracted position by means of a spring 45. The tension on the latter may be varied by means of the threaded member 46. Valve 44 is provided with a passage 47 in communication with the atmosphere through a passage 48 formed in a casing 49, which surrounds the centrifugal governor and constitutes a housing for the valve. The housing 49 is provided with a passage 50 leading to the intake manifold 51 of the vehicle engine. Normally passage 50 is closed by valve 52, operatively connected to the clutch pedal 53. Valve 44 coacts with valve 52 to control the vacuum connection 50 and two passages or pipes 54 and 55 that lead to the opposite ends of a vacuum cylinder 56, within which is mounted a piston 57 connected to the shifting fork 30 by means of piston rod 58. As shown, cylinder 56 is mounted on housing 10a.

Assuming that the drive is from the driving shaft 5 to the low ratio gearing and hence through driven shaft 15, rotation of said shaft at a predetermined speed will cause the centrifugal members 43 to move outwardly around the pivots on arms 42, thereby forcing valve 44 downwardly, as viewed in Fig. 1, to such a position that the annular groove 44a in the valve is brought into register with pipes or passages 50 and 55 (Fig. 3). If the clutch pedal 53 be now depressed to disconnect the engine from the propeller shaft, valve 52 automatically opens the vacuum line (Fig. 3) so that sub-atmospheric pressure is introduced into the right-hand end of cylinder 56. At the same time air is admitted to the left-hand end of the cylinder through port 48, passage 47, and pipe 54. The piston 57 is now drawn to the right, thereby actuating shifter 30 and rod 31 to establish the driving connection between the propeller shaft, sleeve 23 and the gear 24, as shown in Fig. 2. Clutch pedal 53 is now permitted to return to its normal position, under the action of spring 59, whereupon the vacuum connection to the intake manifold 51 is closed. Under these conditions any change in speed of shaft 15 or 18 is ineffective through the centrifugal governor and vacuum cylinder to actuate the shift rod. If the speed of the vehicle is now decreased, the valve occupies the position shown in Fig. 1, and in order to shift from high ratio to the low ratio drive it is only necessary to again depress the clutch pedal 53, whereupon vacuum is admitted through passages 50, 50a and 54 to the left-hand end of cylinder 56, whereupon the shift rod is moved to the left and the parts are brought to the position shown in Fig. 1 to establish the low ratio drive.

As shown in Fig. 4, a speedometer drive 60, of standard or other suitable type, may be operatively connected to one end of shaft 41.

There is thus provided a two-speed rear axle drive, which is inexpensive to manufacture, noiseless in operation, and which is so constructed that the shift in speed from third, or low ratio, gear to fourth, or high ratio, gear and back again may be made without jerking the vehicle and without the clashing of teeth of the shifting members. Due to the use of the one-way driving connection between the propeller shaft 5 and sleeve 23, the construction of shifting member 25 and clutch members 22 and 24 may be varied, i. e., any suitable type clutch members may be employed. If desired, the friction clutch illustrated may be eliminated but preferably the combination friction and positive clutch is used. The splined portion of shaft 5 may, if desired, be increased in length in order to increase the distance between gear 34 and sleeve 23, as viewed in Fig. 1, so that when the sleeve 23 has been moved to fourth gear position, as shown in Fig. 2, it will not necessarily mesh with gear 34. If at any time it is desired to lock out the overrunning clutch, under these conditions, gear 34 may be shifted to the left by actuating sleeve 36. Attention is called to the fact that in the construction shown movement of rod 31 to the left to shift from fourth, or high ratio, gear to third, or low ratio, gear, gear 34 and sleeve 36 remain in the position shown in Fig. 1 so that the freewheeling unit 32, 33 is always effective when such shift is made, thereby avoiding high stresses on the parts. If the vehicle is being driven in third, or low ratio, gear, with the free wheeling unit locked out, a shift of rod 31 to the right to shift from third to fourth gear is automatically effective to move gear 34 to the position shown in Fig. 1.

By varying the tension on spring 45, the speed at which an automatic shift may be made from third gear to fourth gear may be varied, but, as will be appreciated by those skilled in the art, both the control members 31 and 36 may be operated manually through flexible connections, from the driver's seat, if it is not desired to employ the novel automatic shifting means disclosed. It will also be noted that on vehicles fitted with compressors the automatic mechanism for shifting may be operated by compressed air rather than by vacuum. Various changes may be made in the details of construction and operation of the parts, and accordingly reference will be had primarily to the appended claims for a definition of the limits of the invention.

What is claimed is:

1. In apparatus of the class described a driving shaft, a pair of driven shafts drivably connected to one another, a clutch member secured to each of said driven shafts, a shiftable clutch member adapted to be moved into driving engagement with either of said first-named clutch members, means controlled in accordance with the speed of the vehicle on which the apparatus is mounted for shifting said shiftable clutch member, and one-way clutch means for drivably connecting said last-named member and said driving shaft.

2. In apparatus of the class described a driving member, a plurality of driven shafts, a clutch member on each of said shafts, a longitudinally movable clutch member adapted to selectively engage said first-named clutch members, speed controlled means for shifting said movable clutch member, and a one-way driving connection interposed between said movable member and said driving member.

3. In apparatus of the class described a driving member, a plurality of driven shafts, a clutch member on each of said shafts, a longitudinally movable clutch member adaped to selectively engage said first-named clutch members, means for shifting said movable clutch member, a one-way driving connection interposed between said movable member and said driving member, a clutch member mounted for movement axially of, and for rotation with, said driving member, and means for moving said last-named clutch member into driving engagement with said first-named movable clutch member.

4. In apparatus of the class described a driving member, a plurality of concentric driven shafts drivably connected for movement relative to one another, a male clutch member secured to each of said shafts for rotation therewith, a female clutch member adapted to be selectively engaged with said male clutch members, fluid pressure means for actuating said female clutch member, an overrunning clutch interposed between said female clutch member and said driving member, and a clutch member drivably associated with and movable axially of said driving member and adapted to drivably engage said female clutch member.

5. In apparatus of the class described a driving shaft, a plurality of driven shafts, a clutch member secured to each of said driven shafts, a longitudinally movable clutch member, fluid pressure means for shifting said movable member into driving engagement with each of said first-named clutch members, speed responsive means for controlling said fluid pressure means, and means drivably connecting said driving shaft and said longitudinally movable member.

6. In combination a driving member, a plurality of driven shafts, friction and positive clutch members on each of said shafts, a movable friction clutch member, a movable positive clutch member, speed controlled means for selectively moving said movable friction and positive clutch members into successive engagement with said first-named friction and positive clutch members respectively, and means for drivably connecting said movable clutch members to said driving member.

7. In combination with an axle having a differential housing operatively connected thereto and a propeller shaft, high and low ratio gears drivably secured to the differential housing, high and low ratio pinions in mesh with said gears, and means for selectively connecting said propeller shaft to either of said pinions, said means including a clutch member secured to the high ratio pinion, a clutch member secured to the low ratio pinion, longitudinally movable means for engaging either of said clutch members, means for automatically moving said longitudinally movable means, and a one-way driving means operatively associated with said propeller shaft and said longitudinally movable means.

8. In motion transmitting mechanism, a driven member, a driving member, a plurality of gear trains for drivably connecting said members, clutch means for selectively connecting said driving member to each of said gear trains, said clutch means including a member movable longitudinally of said driving member, and a one-way clutch interposed between said movable clutch member and said driving member, the inner race of said one-way clutch being secured to said driving member and the outer race thereof having splined connection with said movable clutch member.

9. In apparatus of the class described, a driving member, a plurality of driven members, a clutch member on each of said driven members, a longitudinally movable clutch member adapted to selectively engage said first-named clutch members, means for shifting said movable clutch member, a one-way driving connection interposed between said movable member and said driving member, and a clutch member drivably associated with said driving member and adapted to drivably engage said movable clutch member.

10. In apparatus of the class described, a pair of coaxial axles, differential gearing for connecting said axles, and means for driving said gearing including a pair of annular bevel gears, said gears being concentrically mounted, a pair of concentric shafts, a gear on each of said shafts in constant mesh with one of said annular gears, friction and positive clutch members on each of said shafts, a movable friction clutch member, a movable positive clutch member, common means for selectively moving said movable friction clutch member into engagement with said first-named friction clutch members and for subsequently moving said movable positive clutch member into selective engagement with said first-named positive clutch members, a driving member and a one-way driving connection interposed between said movable positive clutch member and said driving member.

11. In apparatus of the class described, a pair of coaxial axles, differential gearing for connecting said axles, and means for driving said gearing including a pair of annular bevel gears, said gears being concentrically mounted, a pair of concentric shafts, a gear on each of said shafts in constant mesh with one of said annular gears, friction and positive clutch members on each of said shafts, a movable friction clutch member, a movable positive clutch member, common means for selectively moving said movable friction clutch member into engagement with said first-named frictional clutch members and for subsequently moving said movable positive clutch member into selective engagement with said first-named positive clutch members, a driving member, a one-way driving connection interposed between said movable positive clutch members and said driving member and a clutch member drivably associated with and movable relative to said driving member and adapted to drivably engage said movable positive clutch member.

12. In apparatus of the class described, a pair of coaxial axles, differential gearing for connecting said axles, and means for driving said gearing including a pair of annular bevel gears, said gears being concentrically mounted, a pair of concentric shafts, a gear on each of said shafts in constant mesh with one of said annular gears, friction and positive clutch members on each of said shafts, a movable friction clutch member, a movable positive clutch member, fluid pressure means for actuating said movable clutch members to selectively move said movable friction clutch member into engagement with said first-named frictional clutch members and to subsequently move said movable positive clutch member into selective engagement with said first-named positive clutch members, a driving member and a one-way driving connection interposed between said movable clutch members and said driving member.

13. In apparatus of the class described, a pair of coaxial axles, differential gearing for connecting said axles, and means for driving said gearing including a pair of annular bevel gears, said gears being concentrically mounted, a pair of concentric shafts, a gear on each of said shafts in constant mesh with one of said annular gears, friction and positive clutch members on each of said shafts, a movable friction clutch member, a movable positive clutch member, speed responsive means for actuating said movable clutch members to selectively move said movable friction clutch member into engagement with said first-named frictional clutch members and to subsequently move said movable positive clutch member into selective engagement with said first-named positive clutch members, a driving member and a one-way driving connection interposed between said movable clutch members and said driving member.

RALPH E. LAYMAN.